United States Patent [19]

Ernst et al.

[11] 4,057,258

[45] Nov. 8, 1977

[54] MEASURING ARRANGEMENT

[75] Inventors: Alfons Ernst, Traunreut; Alfred Reichl, Trostberg, both of Germany

[73] Assignee: Dr. Johannes Heidenhain GmbH, Traunreut, Germany

[21] Appl. No.: 642,471

[22] Filed: Dec. 19, 1975

[30] Foreign Application Priority Data

Dec. 20, 1974 Germany .............................. 2460406

[51] Int. Cl.² ............................................. F16J 15/16
[52] U.S. Cl. ........................................ 277/12; 277/80; 277/135
[58] Field of Search ...................... 277/80, 135, 12, 30, 277/181, 226, 237 R; 350/319

[56] References Cited

U.S. PATENT DOCUMENTS

| 3,031,802 | 5/1962 | Leliaert | 277/80 |
| 3,612,549 | 10/1971 | Berkowitz | 277/80 |
| 3,848,879 | 11/1974 | Hudgins | 277/80 |

*Primary Examiner*—Richard E. Aegerter
*Assistant Examiner*—L. Footland
*Attorney, Agent, or Firm*—Hume, Clement, Brinks, Willian & Olds, Ltd.

[57] ABSTRACT

A laser interferometer is disclosed in which the measuring path is enclosed in an elongated hollow body which has a flexible slot along one side through which extends the entrainment means for the movable reflector enclosed within the hollow body. This hollow body is maintained under a vacuum, with the area around the flexible slot being filled with a fluid to help maintain the vacuum. This fluid may be highly viscous oil or a magnetic fluid which is maintained by the magnetic field of permanent magnets.

19 Claims, 11 Drawing Figures

MEASURING ARRANGEMENT

The invention relates to a measuring arrangement comprising a measuring element movable along the measuring path and connected with the object to be measured, where the area immediately surrounding the mesuring path is screened against environmental influences. Measuring arrangements with a measuring element movable along a measuring path are known for example in the form of interferometers where the movable measuring element is the reflector. Moreover, the above measuring arrangement also may be an installation to determine the deviation of the path of a movable construction part from a straight line defined by a Laser beam. However, the measuring arrangement also may be a digital electrical measuring system, where the graduation and a sensor head associated wih it are screened against environmental influences.

A Laser interferometer already has become known from the German publication copy No. 2,113,477 where the area immediately surrounding the path to be masured is screened and evacuated with the aid of a tube. The tube is provided with a slot through which an entrainment means for the reflector extends. The tube is sealed at the slot by a flexible seal through which the entrainment or supporting means passes. In this interferometer arrangement the vacuum can be maintained in the tube only by an uninterrupted post-evacuation with high performance vacuum pumps.

The invention is based on the problem of achieving without any special constructional expenditure a hermetic sealing of the area immediately surrounding the measuring path against atmospheric air, and to maintain the vacuum in the measuring path channel also under movement of the measuring element, without thereby requiring an uninterrupted post evacuation. The invention furthermore is based on the problem of creating a seal at the slot of the hollow body which in addition offers favorable sliding conditions between the entrainment means and the sealing members. Moreover, the invention is supposed to create a dependable seal at the measuring channel of the arrangement which permits a versatile application of the measuring arrangement even under extreme environmental conditions.

The invention solves the problem posed in a measuring arrangement comprising a measuring element movable along a measuring path in that the screening of the measuring path is accomplished by an elongated hollow body having a slot for passing therethrough an entrainment or supporting means for the movable measuring element, whereby the slot is sealed in the hollow body by means of flexible sealing members which accommodate the entrainment means, and that furthermore the gap at the sealing members is filled out with fluid. Vacuum oil or a magnetic fluid are particularly appropriate sealing fluids. Magnetic liquids, designated in the literature also as magnetizable liquid or ferrofluid, represent a dispersion of finely distributed magnetic particles (preferably ferrite materials) in a supporting liquid (for example, kerosene or silicon oils), whereby the word "magnetic" relates to the capability of being magnetizable. Further details about magnetic liquids are found, for example, in the literary passage "International Science and Technology" No. 55, July 1966, page 48 to 56.

The drawing exemplifies embodiments of the invention.

FIG. 1 schematically represents a Laser interferometer,

Figure 1:
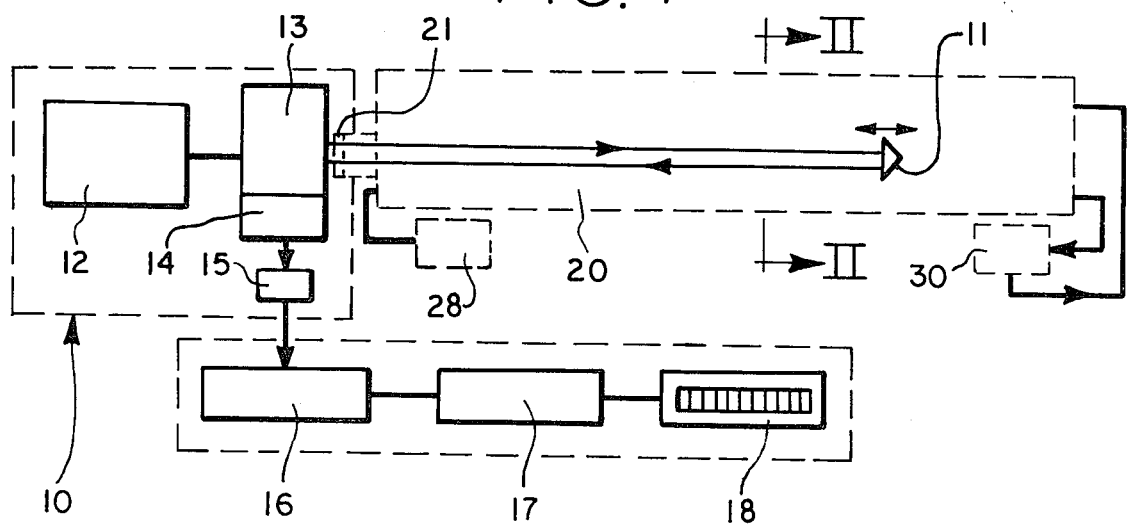

FIG. 1 shows a Laser interferometer according to prior art, wherein the invention shall be exemplified. The interferometer 10 applied to the stationary objective permits in coaction with the movable reflector 11 the measuring of lengths. The housing unit 13 contains the interferometer optic which splits the Laser beam by a beam divider into a measuring beam and into a reference beam. Both beams are reunited at a beam combining means and thus result in interference phenomena which are functions of the difference of the optical path lengths of measuring and reference beams. By shifting the reflector 11 the length of the path traversed by the measuring beam changes. The interference phenomena and the signals derived therefrom photoelectrically change in function thereof. The photo detectors for conversion of the optical signals into electrical signals are in the housing assembly 14. The construction unit 15 contains the amplifiers and triggers for the electrical signals. The number of signal periods passing through under a shifting of the reflector 11 are counted in a count-up and count-down counter 16. The measured displacement is converted into decimal values in the computer 17. The reading can be read at the indicator instrument 18. The above described interferometer arrangement in its details is not the subject of the invention, and thus it is not elucidated in detail. The interferometer arrangement may be designed in any desired manner as known from prior art.

In measuring arrangements where the measuring is carried out by comparing the shift path of a movable measuring element with the length of the light wave it proved to be disadvantageous that in the area of the measuring path the wave length forming the basis of the reading changes in function of atmospheric influences (atmospheric pressure, humidity, $CO_2$ content, temperature). This leads to faulty readings, unless in an expensive manner a computer is used for compensating for the environmental influences. The above mentioned disadvantage is avoided in the arrangement according to the invention by placing the path to be measured in vacuum, because only under vacuum the wave length of light represents an absolute physical value.

Figure 2:
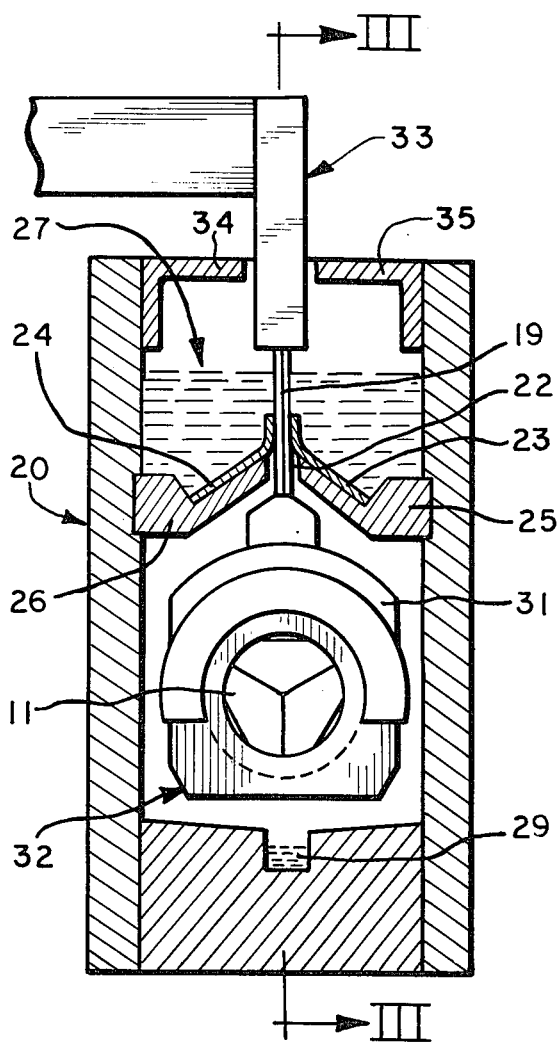
FIG. 2 is a section along line II—II of the basic sketch shown in FIG. 1.
Figure 3:
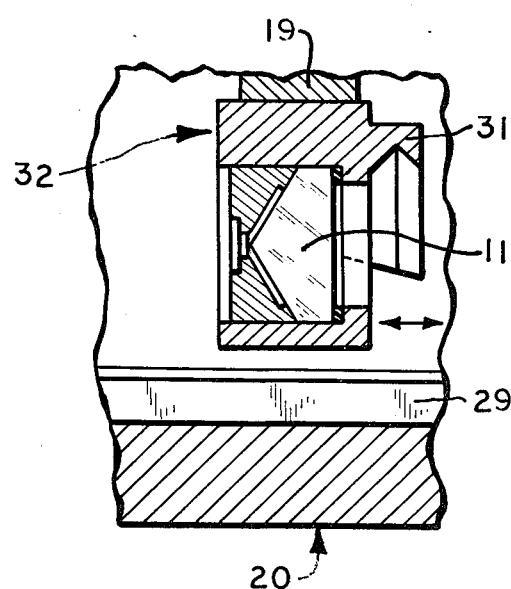
FIG. 3 is a section along line III—III of FIG. 2.

FIG. 2 shows a screening of the measured path according to the invention. The reflector 11 of the interferometer arrangement is placed via an entrainment or supporting means 19 in an elongated hollow body 20.

The Laser beam cluster arrives via a window 21 in the hollow body 20. Said hollow body 20 is provided with a slot 22, with the entrainment means 19 extending therethrough. The slot 22 is sealed by means of flexible sealing lips 23/24 arranged roof-like, the slender entrainment means of sword-like design being guided through between them. The sealing lips 23/24 are applied appropriately at protruding strips 25/26 at the hollow body. The area about the sealing lips 23/24 is filled, according to another feature of the invention, with a liquid 27, preferably vacuum oil, so that only relatively highly viscous oil can flow through the fine leakage points at the sealing lips. A vacuum pump 28 (FIG. 1) generates a vacuum in the hollow body 20 which is maintained even with the movement of the entrainment means 19. With this special design of the seal in the form of sealing lips 23/24 in connection with the measure of filling the area surrounding the sealing lips 23/24 with oil, the special advantage results that an uninterrupted post-evacuation of the measuring path channel no longer is required. This also permits the use of a vacuum pump of lower capacity.

The leakage oil is captured in a collecting groove 29 of the hollow body 20 and returned with the aid of a small oil pump 30 (FIG. 1) back to the sealing lips 23/24. The reflector 11 is fastened via a socket 32 to the entrainment means 19. A screen 31 at the socket 32 protects the reflector 11 against contamination by leaking oil. The entrainment means 19 for the reflector 11 is fastened to a support 33 connected with the movable object, for example a machine carriage. Protective panels 34/35 protect the sealing fluid 27 against contamination.

Figure 4:
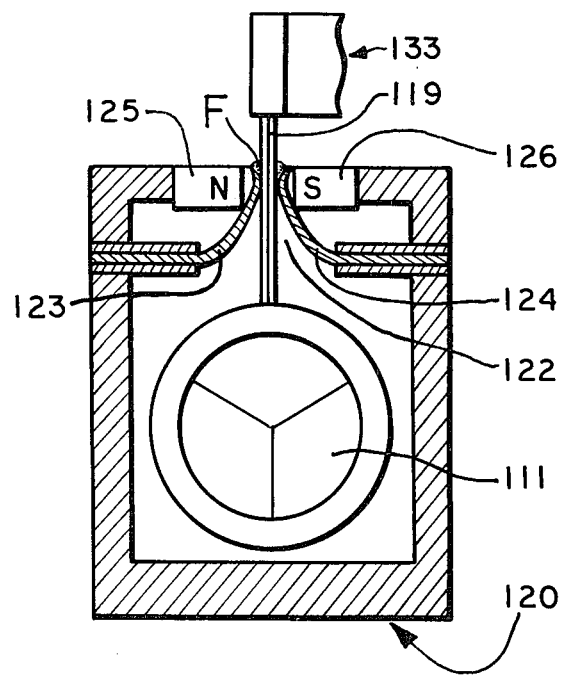
FIG. 4 is an embodiment with a magnetic liquid.

FIG. 4 shows an additional screening of the path to be measured according to the invention. The reflector 111 is mounted via a slender sword-like entrainment means 119 in the evacuated hollow body 120. The slot 122 in the hollow body 120 is sealed by flexible sealing lips 123/124 arranged roof-like. The sealing lips 123/124 preferably are made from plastic. The ends of the sealing lips 123/124 are shaped outwardly. In the V-shaped channel formed by this shaping a magnetic fluid F is filled, which is maintained by the magnetic field of permanent magnets 125/126, assuring a hermetic sealing of the evacuated hollow body 120 even under movement of the entrainment means 119 and/or the object 133 to be measured. The permanent magnets 125/126 extend over the entire length of the sealing lips 123/124. Several advantages result from the measures according to the invention, namely to cover the slot at the hollow body 120 by roof-shaped sealing lips 123/124 and by additionally filling the only very fine sealing gaps with magnetic fluid F. On the one hand, thanks to the fine gaps at the sealing lips 123/124, the magnetic fluid F is held safely even at high vacuum or extreme environmental conditions, and on the other hand favor sliding conditions result by feeding in the magnetic fluid F between the entrainment means 119 and the sealing lips 123/124. Moreover the vacuum can be maintained in the hollow body 120 without post evacuation through this seal over a long period. Another advantage is the favorable design of the screening of the measuring path which permits the installation of the measuring arrangement in any position.

Figure 5:
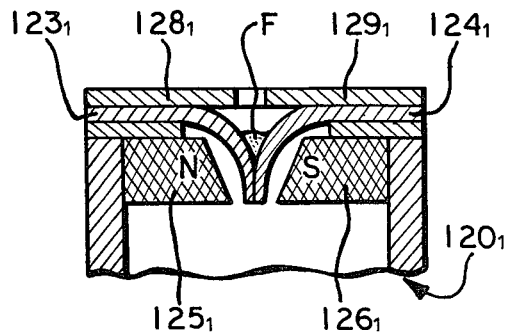
FIG. 5 is an additional embodiment with inwardly pointing sealing lips.

FIG. 5 shows an arrangement with roof-shaped sealing lips $123_1/124_1$ extending into the cavity of the body $120_1$, accommodating the entrainment means in the manner shown in FIG. 4. The magnetic fluid F is fed into the V-shaped groove formed by the sealing lips $123_1/124_1$. The magnetic fluid F in the gaps of the seal is held firmly by the permanent magnets $125_1/126_1$ mounted in the interior of the hollow body $120_1$. Protective panels $128_1/129_1$ protect the sealing lips $123_1/124_1$ against mechanical damage. The simple and compact design is advantageous in this arrangement, because it permits a versatile applicability of the measuring arrangement even under extreme environmental conditions.

Figure 6:
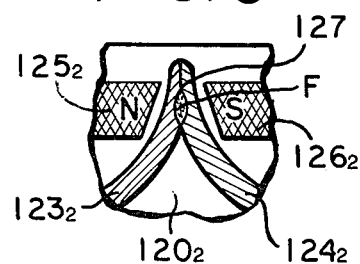
FIG. 6 is an additional embodiment with a groove in the sealing lips.

In the arrangement according to FIG. 6 a groove 127 is formed at the inner surface of the roof-shaped sealing lips $123_2/124_2$, magnetic fluid F being placed thereinto. The magnetic field F is maintained in the groove 127 by permanent magnets $125_2/126_2$. The groove is connected to an equalization tank (not shown), which is mounted at the frontal side of the hollow body $120_2$. It is advantageous with this arrangement that dust or dirt particles cannot get into the magnetic fluid F.

Figure 7:
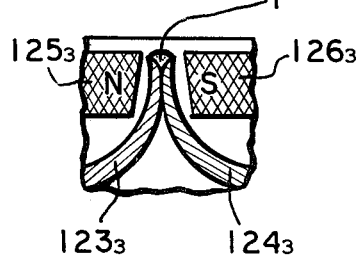
FIG. 7 is an embodiment where the ends of the sealing lips are beveled.

FIG. 7 shows an arrangement where the ends of the roof-shaped sealing lips $123_3/124_3$ are beveled. The magnetic fluid F is placed into the V-shaped groove formed by the lips $123_3/124_3$. Permanent magnets $125_3/126_3$ firmly hold the magnetic fluid F located in the gaps.

Figure 8:
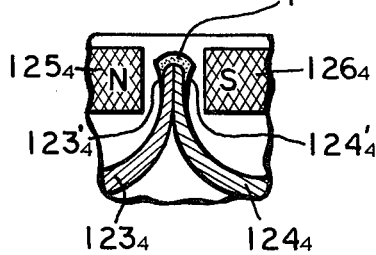
FIG. 8 shows an additional possibility of an embodiment, comprising a pocket for the sealing fluid provided at the outside of the sealing lips.

FIG. 8 shows an arrangement comprising thin ridges or walls $123'_4/124'_4$ formed near the end of the sealing lips $123_4/124_4$, the magnetic fluid F being placed between said ridges. The magnetic fluid F is held firmly by the permanent magnets $125_4/126_4$.

Figure 9:
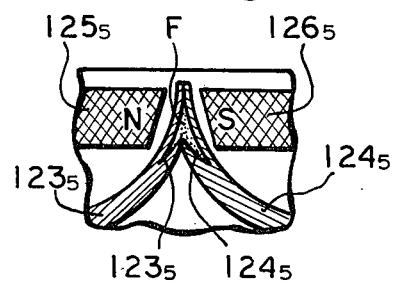
FIG. 9 is an additional possibility of an embodiment comprising a pocket for the sealing fluid provided at the inside of the sealing lips.

In FIG. 9 thin roof-shaped lips $123'_5/124'_5$ are shaped to the inside of the sealing lips $123_5/124_5$. The magnetic fluid F is placed in the pocket formed by the pairs of sealing lips $123_5/$ and $123'_5/124_5$ and $124'_5$. This arrangement has the advantage that neither dust nor dirt particles can ingress into the magnetic fluid F.

Figure 10:
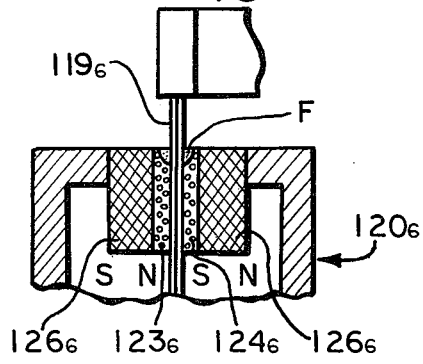
FIG. 10 represents an additional embodiment with soft sealing strips.

FIG. 10 shows an arrangement where the slot for the entrainment means $119_6$ is sealed by soft plastic or rubber sealing strips $123_6/124_6$. The sealing strips $123_6/124_6$ are fastened appropriately to permanent magnets $125_6/126_6$ applied to the hollow body $120_6$. The magnetic fluid F is fed appropriately in a groove at the sealing strips $123_6/124_6$. It is held firmly by the permanent magnets $125_6/126_6$ in the gaps. The sealing strips which accommodate the entrainment means $119_6$ within them also may be made from magnetized plastic material.

Figure 11:
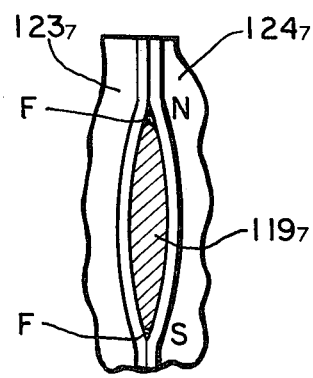
FIG. 11 is an embodiment where the entrainment means is a permanent magnet.

In the arrangement according to FIG. 11 the sword-shaped entrainment means $119_7$ is designed at least partly as a permanent magnet only holding firmly the magnetic fluid F fed in at the fine gaps at the end of the sword between the roof-shaped sealing lips $123_7/124_7$ and entraining the fluid upon movement. This arrangement is particularly appropriate for the covering of hollow bodies into which the graduation and the sensor head of a digital electrical longitudinal measuring system are placed.

Naturally, the invention is not limited to the application in an interferometer, but it is applicable analogously for example also in installations to determine the deviation of the path of a movable construction component (photo detector) from a straight line defined by a Laser beam cluster. In testing instruments for straightness of this kind, as it is known, a fluctuating refractory index of the air shows up as a disturbing fluctuation of the straight reference line, which leads to erroneous readings. Such erroneous readings are prevented by the screening according to the invention.

What is claimed is:

1. A measuring instrument for measuring the relative position of an object, comprising: a measuring element movable along a path; a supporting means for connecting the movable measuring element to the object whose position is to be measured; an elongated hollow body enclosing the area around the measuring element's path; an elongated slot formed in the hollow body, the slot extending along substantially the entire length of one longitudinally extending side of the hollow body, the slot being of sufficient size to permit the passage therethrough of the supporting means; flexible sealing members extending over the slot to seal the slot along its entire length and to accommodate the passage of the supporting means; and, a fluid which cooperates with the sealing members to seal the slot.

2. The measuring instrument of claim 1, wherein the field is a magnetic fluid and a means for generating a magnetic fluid is provided to maintain the magnetic fluid in position for cooperating with the sealing members to seal the slot.

3. The measuring instrument of claim 2, wherein the sealing members are flexible, roof-shaped sealing lips and the magnetic field is located at the gap formed where the sealing lips mate.

4. The measuring instrument of claim 2, wherein the magnetic field means include permanent magnets extending from the hollow body into the immediate vicinity of the gap where the sealing members meet, the permanent magnets extending along the entire length of the sealing members.

5. The measuring instrument of claim 2, wherein the sealing members are soft strips having longitudinally extending channels along their mating surfaces, which channels cooperate with each other to form a groove into which the magnetic field is disposed.

6. The measuring instrument of claim 5, wherein the magnetic field means include permanent magnets extending the entire length of the slot, the permanent magnets are affixed to the hollow body and the sealing strips are fastened to the permanent magnets.

7. The measuring instrument of claim 2, wherein the flexible sealing members define a groove in which the magnetic fluid is disposed for sealing the slot.

8. The measuring instrument of claim 1, wherein the flexible sealing members are plastic, the fluid is a magnetic fluid, and permanent magnets are provided along the entire length of the sealing members to maintain the magnetic fluid in position for cooperating with the sealing members to seal the slot.

9. The measuring arrangement according to claim 1, wherein the hollow body is sealed by means of flexible, roof-shaped sealing lips accommodating the entrainment means within themselves, and the area about the sealing lips is filed out with vacuum oil.

10. A measuring instrument for measuring the relative position of an object, comprising: a measuring element movable along a path; a supporting means for connecting the measuring element to the object whose position is to be measured; an elongated hollow body enclosing the area around the measuring element's path; an elongated slot formed in and extending along one longitudinally extending side of the hollow body, the slot being of sufficient size to permit the passage therethrough of the supporting means; a pair of mating, flexible, roof-shaped sealing lips extending over the slot to seal the slot along its entire length while permitting the passage therethrough of the supporting means; a groove formed between the sealing lips; a magnetic fluid disposed in the groove to seal said groove; and a means for generating a magnetic field to maintain the magnetic fluid in the groove.

11. The measuring instrument of claim 10, wherein the magnetic field means includes permanent magnets extending along the length of the sealing lips.

12. The measuring instrument of claim 10, wherein the sealing lips are curved away from the area enclosed by the hollow body, the magnetic field means includes permanent magnets, and the magnetic fluid is disposed in the groove formed between the external longitudinal ends of the mating portions of the sealing lips and is maintained in the groove by the permanent magnets.

13. The measuring instrument of claim 10, wherein the mating portions of the sealing lips are curved toward the area enclosed by the hollow body and the magnetic fluid is disposed in the groove formed above the mating portions of the sealing lips.

14. The measuring instrument of claim 10, wherein the opposed, mating surfaces of the sealing lips are each provided with a longitudinally extending channel, which channels form a continuous, longitudinally extending internal groove between the sealing lips and wherein the internal groove is filled with the magnetic fluid.

15. The measuring instrument of claim 14, wherein the internal groove is connected to a magnetic fluid equalization and supply tank.

16. The measuring instrument of claim 10, wherein the outer ends of the mating portions of the sealing lips are believed.

17. The measuring instrument of claim 10, wherein the ends of the mating portions of the sealing lips are provided with thin, outwardly extending walls on their outer sides, said walls defining the groove between the sealing lips in which the magnetic fluid is disposed.

18. The measuring instrument of claim 10, wherein the opposed, mating surfaces of the sealing lips are formed into upper and lower longitudinally extending sealing lips, said upper and lower lips defining therebetween an internal groove in which the magnetic fluid is disposed.

19. The measuring arrangement according to claim 10, wherein the sword-shaped entrainment means passing through the roof-shaped sealing lips is a permanent magnet, and the magnetic fluid is placed into the gap at the end of the sword and maintained by the magnetic field of the sword.

* * * * *

UNITED STATES PATENT AND TRADEMARK OFFICE
CERTIFICATE OF CORRECTION

PATENT NO. : 4,057,258
DATED : November 8, 1977
INVENTOR(S) : ALFONS ERNST et al.

It is certified that error appears in the above-identified patent and that said Letters Patent are hereby corrected as shown below:

In column 1, line 9, "mesuring" should read -- measuring --;

line 18, "wih" should read -- with --; line 23, "masured" should read -- measured --.

In Claim 2, line 2, "field" should read -- fluid --; line 3, "fluid" should read -- field --.

In Claim 3, line 3, "field" should read -- fluid --.

In Claim 5, line 5, "field" should read -- fluid --.

In Claim 16, line 3, "believed" should read -- beveled --.

Signed and Sealed this

Twenty-second Day of August 1978

[SEAL]

Attest:

RUTH C. MASON
Attesting Officer

DONALD W. BANNER
Commissioner of Patents and Trademarks